Feb. 12, 1963
R. C. K. HEUSER ETAL
3,077,428
HEAT SEALABLE POLYETHYLENE LAMINATE
AND METHOD OF MAKING SAME
Filed June 29, 1956
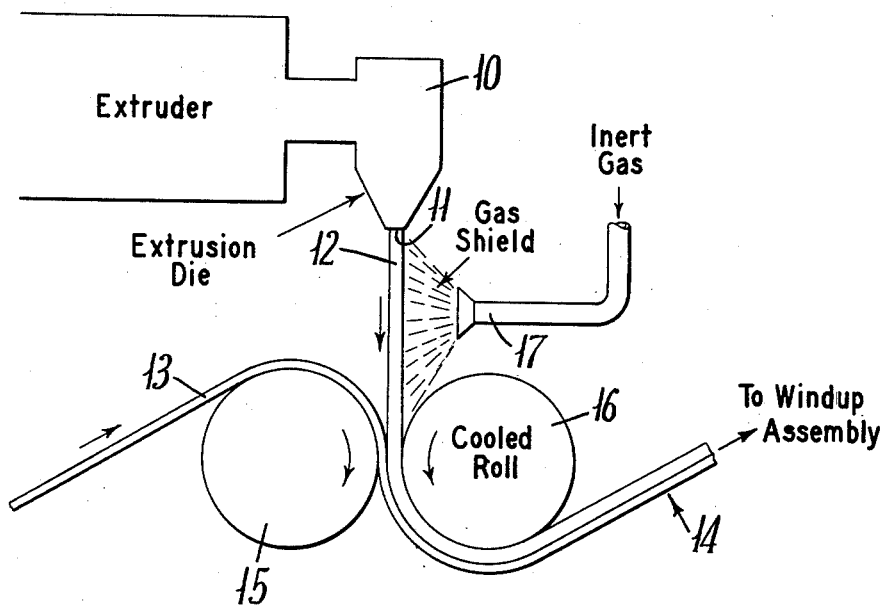
INVENTORS
RHODA C.K. HEUSER
WALTER A. HAINE
BY *Elmer J. Fischer*
ATTORNEY

United States Patent Office 3,077,428
Patented Feb. 12, 1963

3,077,428
HEAT SEALABLE POLYETHYLENE LAMINATE
AND METHOD OF MAKING SAME
Rhoda C. K. Heuser, Rochester, N.Y., and Walter A. Haine, Scotch Plains, N.J., assignors to Union Carbide Corporation, a corporation of New York
Filed June 29, 1956, Ser. No. 594,928
10 Claims. (Cl. 154—50)

This invention relates to a process for improving the heat sealability of polyethylene surfaces to each other.

More particularly the invention is concerned with a treatment of polyethylene in film form whereby one planar surface is treated to impart satisfactory adhesion to another polyethylene surface, and the other planar surface is treated to impart satisfactory adhesion to non-polyethylene surfaces such as paper, metallic foil, cellophane and like sheet materials to form therewith composite sheet or laminated structures capable of being sealed by hot-pressing together the polyethylene surfaces of the composite sheets.

These laminated materials are useful as wrapping or packaging materials, chemical-barrier materials and fabrication sections. Polyethylene coatings provide good resistance to chemicals such as acids and bases which cellophane, aluminum, and other substrates do not possess alone.

In the continuing search for new and improved packaging, barrier and fabrication materials, it has been found that common materials of limited application such as paper, foil and cellophane can be materially benefited when combined with polyethylenic sheeting or film. A conventional means for upgrading paper and the like that has found wide acceptance comprises extruding a film of polyethylene and bringing the hot film into intimate contact with the paper substrate and bonding it to the substrate by application of pressure.

Such upgraded materials have better moisture resistance and water vapor resistance, have improved strength and are more resistant to chemical attack.

However, polyethylene films extruded at the temperatures normally used for unsupported flat film extrusion, e.g., about 210° C., are not generally suitable for this purpose. The adhesive characteristics of the film are unsatisfactory for bonding the film to a substrate, particularly a smooth-surfaced substrate such as metal foil. Elevated temperatures, generally about 50° C. higher than the normal extrusion temperatures, must be employed to obtain satisfactory adhesion between the film and substrate.

While extrusion at such elevated temperatures improves the adhesive characteristics of polyethylene film, it severely injures the heat sealability of the film. Also, the high temperature fosters degradation of the polyethylene as may be evidenced by an increased tendency for rancid odor formation, discoloration, and "blocking," the tendency for sheets of polyethylene to stick to each other, even though surface tackiness is not apparent.

By "heat sealability" is meant the ability of polyethylene to bond to itself by conventional heat sealing means such as bringing together two polyethylene areas for about three seconds at about 350° F. under a pressure of about 40 p.s.i. Heat sealability finds importance, for example, in effecting closure of polyethylene-coated bags.

Surface treatment of a polyethylene coating that has been extruded at high temperature may improve the heat sealability. Such treatment comprises buffing or abrading the surfaces to be sealed. As might be expected, however, the appearance of the coating is impaired and the discoloration, blocking, and increased susceptibility for subsequent development of rancid odor that may accompany high-temperature extrusion remain problems that impose serious limitations on the application of the final product.

A technique that is currently employed comprises high temperature extrusion of a polyethylene film with subsequent bonding to a non-polyethylenic substrate. A second polyethylene film is then extruded at a lower temperature and is bonded to the exposed surface of the high-temperature-extruded film. Obviously this technique cannot be employed where thin coatings are desired or required. As with the previously described method, this method requires additional process equipment and additional process operations.

The previously described methods are concerned with improving the heat sealability of the final product. However, it might be possible to produce a product having poor heat sealability and then resort to the more drastic sealing conditions such as higher sealing temperatures, pressures and times required by such a product. However, higher sealing temperatures and pressures cause the polyethylene to flow away from the seal area and weak seals result. Seals made at the lower temperatures and pressures currently in practice exhibit greater strength than those made under more drastic conditions; the latter are too weak for most applications.

Poor heat sealability is not necessarily manifest immediately; it may appear after coated materials have been stored for a few months, even at room temperature.

The extent to which heat sealability and the other properties of polyethylene are degraded by exposing the polyethylene to elevated temperature depends on both the temperature and the duration of exposure. For example, polyethylene subjected to even the normal unsupported-flat-film-extrusion temperature for an extended period of time may suffer a reduction in heat sealability and show signs of general degradation as discussed previously. Alternatively, if polyethylene is to be subjected to elevated temperatures for only a short time, a higher temperature is permissible than can be tolerated for a longer period of time.

It is an object of this invention to provide a method for firmly bonding a film of normally-solid polyethylene composition to a non-polyethylenic substrate wherein the heat sealability of the polyethylene film is retained substantially unimpaired.

It is another object to provide a means for minimizing high-temperature degradation of polyethylene as evidenced by the development of rancid odor, discoloration, blocking and reduced heat sealability following high-temperature treatment of the polyethylene.

Other objects will be apparent from the discussion of the invention.

The objects are achieved by maintaining the polyethylene composition in an inert atmosphere from the time of extrusion until the material is cooled, thereby substantially shielding the material from oxygen and its degrading influence.

The invention may be more clearly understood by reference to FIGURE 1.

The apparatus of the drawing schematically represents an extrusion die 10, for extruding polyethylene film, rolls 15 and 16, for bonding the film to the substrate, and gas manifold 17, for maintaining an inert gas shield on the film surface until the film solidifies.

A film of normally-solid polyethylene 12 is extruded downward from extrusion die 10 into the bight of a pair of counter-rotating rolls 15 and 16. The substrate 13 to be coated is passed over roll 15 and is brought into intimate contact with film 12 in the bight of roll 15 and 16 wherein the film and substrate are bonded. From the rolls, the newly formed laminate 14 passes to further processing or to a wind up assembly.

The polyethylene film is air-cooled to some extent as it traverses the span between extrusion die lip 11 and the rolls, and by contact with the cooled roll 16. It is during the period beginning when the film leaves the extrusion die lip until it is cooled by roll 16 that it is essential to prevent the excess of oxygen to the film. By introducing an inert gas such as nitrogen, carbon dioxide, a noble gas, etc., through gas manifold 17, it is possible to blanket the film with inert gas, thereby substantially shielding the film from oxygen.

The invention was described with respect to the particular apparatus of the figure, and with respect to the extrusion of flat film. However, these are not limitations on this invention.

It is not necessary that the process be limited to film extrusion. The odor-forming, discoloration and blocking characteristics of any extruded polyethylene may be greatly enhanced by shielding the extrusion product from oxygen. Similarly, good properties may be maintained in polyethylene even though the material is heated to an elevated temperature if the material is shielded from an oxidizing atmosphere.

Even though the temperatures normally used for polyethylene flat film extrusion do not create as serious a heat sealability problem as found in the higher temperature film coating process, nevertheless, by blanketing the hot film with an inert gas, heat sealability and resistance to odor formation and discoloration may be improved and blocking is reduced.

An appropriately shaped hood may be employed to introduce the inert gas blanket in place of the gas manifold.

Many other means of applying and practicing this invention will be obvious to those skilled in the art.

Preheating the substrate, extruding at higher temperatures and passing air, particularly preheated air, across the surface of the film which is to be bonded to the substrate have all been found to improve the adhesion of the film to the substrate and to injure the heat sealability of the film and the other properties discussed previously. By the method of this invention, it is now possible to apply any or all of these techniques without injuring the film heat sealability; it is only necessary that the film surface which is not bonded to the substrate in the process be shielded from oxygen while at the elevated temperature.

In some cases adhesion may be still further improved by preheating the inert gas to minimize cooling of the film.

The process of this invention finds wide applicability with various polyethylene, and modified polyethylene compositions.

The following polyethylene compositions were applied to dead-soft, dry, annealed, one-mil-thick aluminum foil to form a 3.5 mil coating thereon:

A and B comprising polyethylene resin having a melt index of 3.1 and specific gravity of 0.92;

C comprising a polyethylene resin having a melt index of 0.56 and a specific gravity of 0.92;

D comprising 100 parts of A, 0.03 part commercial grade oleamide and 0.005 part di-tert-butyl-p-cresol as an antioxidant; these materials were Banburied together for about 10 minutes under a ram pressure of 80 p.s.i.g. with cooling water circulating through the Banbury rotor and jacket at such a rate that the mass temperature rose gradually to 120° C. during this period; the material was then sheeted on a two-roll mill at 100° C. for four minutes, cooled, and granulated;

E comprising 95 parts of a polyethylene resin having a melt index of 1.7 and specific gravity of 0.91, 5 parts of polyisobutylene having a nominal molecular weight (Staudinger viscosity method) of about 20,000 (Enjay's "Vistanex L-120"), and 0.02 part di-tert-butyl-p-cresol as an antioxidant; the materials were Banburied together for 8.5 minutes under a ram pressure of 40 p.s.i.g. with cooling water circulating through the Banbury rotor and jacket at such a rate that the mass temperature rose gradually to 130° C. during this period; the material was then sheeted on a two-roll mill for about three minutes at 135° C., cooled, and granulated.

The extrusion and coating operating conditions, with the exception of the extrusion atmosphere, are shown in Table I. Apparatus similar to that shown in the figure was employed.

Table I

| Film Composition | Polyethylene Temperature at extrusion Die Lips, ° C. | Extrusion Rate, lbs./hr. | Substrate Speed, ft./min. | Roll Pressure, lbs./lineal inch |
| --- | --- | --- | --- | --- |
| A | 255 | 15.7 | 10 | 55 |
| B | 265 | 35 | 21 | 55 |
| C | 268 | 15.7 | 10 | 55 |
| D | 252 | 15.7 | 10 | 55 |
| E | 275 | 15.7 | 10 | 55 |

In each case, part of the material was extruded without oxygen shielding and the remainder was extruded with oxygen shielding. The final laminates were then tested for initial heat sealability and for heat sealability after aging.

Initial sealability was tested as follows:

Two sections of laminated material were placed coated-face to coated-face and an approximately one inch wide seal was made with a conventional heat sealer (3 second heat at 350° F. and 40 p.s.i. pressure). A one inch wide strip was cut perpendicular to the direction of the seal. One end of this strip was attached to a fixed bar and a two pound weight clamped onto the other end in such manner that the weighted strip was freely suspended. After the strip had been so suspended for one hour at room temperature, the sealed area was carefully examined and the degree of separation which had occurred was noted.

Heat sealability after aging was tested according to the method of Military Specification MILB–131B.

The coated foil was conditioned for 8 hours at 100° F. and 100% relative humidity, then for 16 hours in a 160° F. oven, then for 8 hours at 100° F. and 100% relative humidity, then for 16 hours in a 160° F. oven. The material was then treated as for the initial sealability test.

MILB–131B rates a material as passing if the seal delamination does not exceed ¼ inch in depth.

The results of these tests are shown in Table II.

Table II

| Film Composition And treatment | Extrusion Atmosphere | Heat Sealability | |
| --- | --- | --- | --- |
| | | Initial | After Aging |
| A | Air | Excellent | failed in 5 minutes. |
| A | Nitrogen blanket | do | passed. |
| B | Air | Very good | failed in 15 minutes. |
| B | Nitrogen blanket | do | passed. |
| C | Air | Excellent | failed in 2 minutes. |
| C | Nitrogen blanket | do | passed. |
| D | Air | do | failed in 1 hour. |
| D | Nitrogen blanket | do | passed. |
| E | Air | Very good | failed—did not support weight. |
| E | Nitrogen blanket | do | passed. |

As may be seen from the table, the polyethylene films, extruded at elevated temperatures for firm bonding to the substrate, must be shielded from oxygen during extrusion and until cooled if the film is to retain its heat sealability. By following the teachings of this invention it is possible to take advantage of high temperature treatment without having the disadvantages that previously accompanied high temperature treatment.

What is claimed is:

1. Method for forming a polyethylene film having one surface characterized by heat-sealability to a polyethylene surface and the other surface by adhesiveness to a non-polyethylenic substrate which comprises extruding polyethylene as a film, immediately blanketing with an inert gas that surface of the film which is to be heat-sealable as it emerges from the extruder and until it has cooled below its heat-degradation temperature while simultaneously exposing the other surface which is to adhere to a non-polyethylenic substrate to an oxygen containing atmosphere.

2. Method according to claim 1 wherein the extrusion temperature is between about 255° C. and 275° C.

3. Method for forming a laminate of a polyethylenic film and a non-polyethylenic substrate, said laminate being characterized by an exposed heat-sealable polyethylene surface which comprises extruding a polyethylene film, immediately blanketing with an inert gas that surface of the film which is to be heat-sealable as it emerges from the extruder and until the film is adhesively bonded to a non-polyethylenic substrate while simultaneously exposing the other surface to an oxygen containing atmosphere, and immediately thereafter adhering the non-polyethylenic substrate to said other surface of the polyethylene film.

4. Process according to claim 3 wherein the non-polyethylenic substrate is metallic foil.

5. Process according to claim 3 wherein the non-polyethylenic substrate is paper.

6. Process according to claim 3 wherein the non-polyethylenic substrate is cellophane.

7. A laminate comprising a nonpolyethylenic substrate and a polyethylene film, one surface of which was at least partly oxidized and is heat and pressure bonded to said nonpolyethylenic substrate, and wherein the other surface of said polyethylene film was kept unoxidized and thereby heat-sealable by continuous maintenance in an inert gas from the time of extrusion to cooling to below the heat degradation temperature of the polyethylene.

8. A laminate as in claim 7 wherein the non-polyethylenic substrate is metallic foil.

9. A laminate as in claim 7 wherein the non-polyethylenic substrate is paper.

10. A laminate as in claim 7 wherein the non-polyethylenic substrate is cellophane.

References Cited in the file of this patent

UNITED STATES PATENTS

| | | |
|---|---|---|
| 2,451,597 | Wheeler | Oct. 19, 1948 |
| 2,683,894 | Kritchever | July 20, 1954 |
| 2,714,571 | Irion et al. | Aug. 2, 1955 |
| 2,715,088 | Gunning | Aug. 9, 1955 |
| 2,839,441 | Kent | June 19, 1958 |

FOREIGN PATENTS

| | | |
|---|---|---|
| 538,827 | Great Britain | Aug. 19, 1941 |

OTHER REFERENCES

"Welding of Plastics" (Haim and Zade), published by Crosby Lockwood & Son, Ltd. (London), 1947; pages 70–71 relied on.